Feb. 14, 1933.   F. B. NEWELL   1,897,325
ANEROID BAROMETER
Filed Oct. 15, 1927
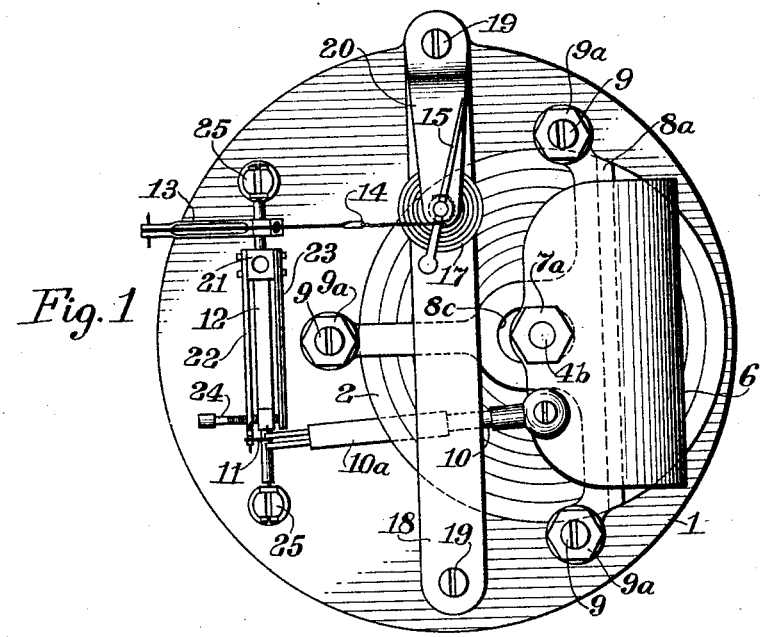
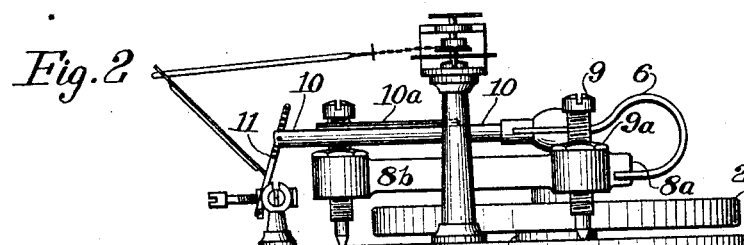
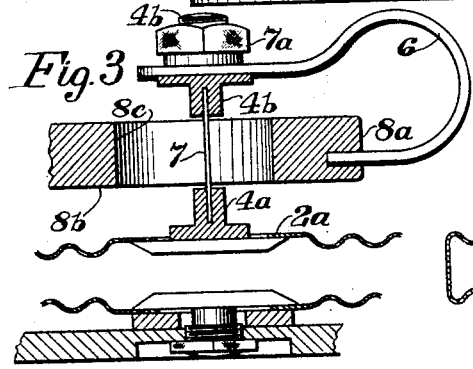
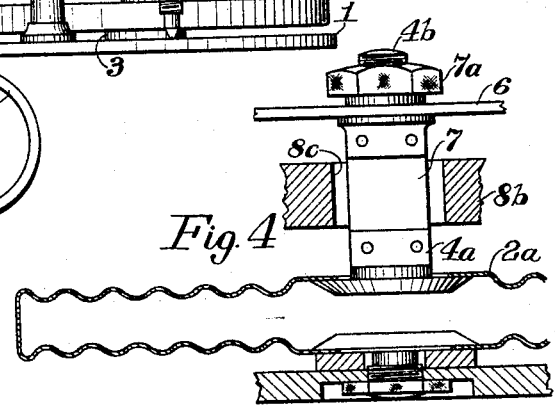
INVENTOR:
Floyd B. Newell
BY Alfred Burger
his ATTORNEY Patented Feb. 14, 1933

1,897,325

UNITED STATES PATENT OFFICE

FLOYD B. NEWELL, OF ROCHESTER, NEW YORK, ASSIGNOR TO TAYLOR INSTRUMENT COMPANIES, OF ROCHESTER, NEW YORK, A CORPORATION OF NEW YORK

ANEROID BAROMETER

Application filed October 15, 1927. Serial No. 226,467.

This invention relates to barometers of the aneroid type and more in particular to an instrument for measuring altitudes.

The aneroid barometer type of instrument is generally well adapted for aviation purposes, but it has been found that certain mechanical characteristics constituted a serious draw-back in connection with the problems and the exigencies of aeronautics.

In the course of extended investigations it has been found that one of the contributing factors to the phenomenon generally referred to as "hysteresis" is the knife-edge connection between the main spring and the stud on the vacuum chamber.

I have found that due to the slight angular motion of the upper or free leg of the main spring the engagement between the latter and the knife edge generally associated therewith constituted a source of frictional resistance the practical effect of which was a lag first during the decrease of pressure and then again during the increase of pressure corresponding to an ascent and a descent, respectively, of a flying machine.

The present invention has as its object the elimination of hysteresis to the extent that it was caused by or was inherent in the usual knife-edge connection above referred to.

For a full understanding of the invention reference is made to the accompanying drawing wherein Fig. 1 is a plan view of the mechanism embodying the invention;

Fig. 2 is a side view thereof; and

Figs. 3 and 4 are two side views taken at right angle to each other of the detail construction with which the invention is more particularly identified.

Having reference to the drawing, 1 is a supporting disk to which is secured the vacuum chamber 2 by means of the usual stud connection 3. From the opposite wall of the vacuum chamber rises a stud 4a for connection with the main spring 6, as best shown in Figs. 3 and 4.

I propose to interconnect the upper wall 2a of the vacuum chamber with the spring 6 by means of a flexible connector, as indicated on an enlarged scale in Figs. 3 and 4.

The connector preferably has the form of a thin steel band 7 securely attached to a stud 4a on the wall of the vacuum chamber, on the one hand, and to a stud 4b securely attached to the main spring, on the other hand, by means of a nut 7a or in any other suitable manner.

The means for supporting the spring 6 preferably comprises a T-shaped carriage including the transverse arm 8a and the shank 8b extending centrally from and at right angles to the transverse arm 8a. Near its inner end or line of junction with the arm 8a, the shank 8b is widened to provide for a central opening 8c to allow the band 7 to extend through for its connection between the studs 4a and 4b.

The T-shaped member is provided at its extremities with adjusting screws 9 adapted to be locked in adjusted position by means of lock nuts 9a. The screws 9 have pointed ends normally bearing upon the disk 1 and preferably take in depressions formed therein.

The lower leg of spring 6 is attached at its free end to the outer face of the transverse arm 8a of the carriage and the upper leg which is considerably longer than the lower leg, extends well beyond the inner face of the transverse arm so that the pressure reaction between the spring 6 and the carriage holds the latter firmly against the disk 1 at the three points of support.

The spring 6 carries an arm 10 connected by means of a link 11 to a shaft 12 which, in turn carries a crank arm 13 connected by means of a fine chain 14 or the like with the pointer 15 mounted on a drum on which the chain is wound under the action of a hair spring 17.

The drum and spring 17 are mounted between a bridge 18 supported by means of studs 19 upon disk 1 and a plate 20 secured to the bridge.

The arm 10 which may be of brass, includes a strip 10a of invar steel or the like to function as a bimetallic arm.

On the shaft 12 which is supported in bearings 25 are mounted by means of a coupling 21 or in any other way two strips 22 and 23 extending on opposite sides of the shaft and substantially parallel thereto. The strip 22, which may be of any metal having suitable resilient property, carries a set screw 24 which extends through a bore in shaft 12 and may be adjusted to bear against the strip 23 to force it out of its normal position of rest away from the shaft. The strip 23 is composed of two metals forming a bimetallic strip of usual type.

The arm 11 is connected to the free end of the strip 22.

The functional significance of the apparatus is as follows:

The main spring 6 is always under tension tending to move outwardly or away from the vacuum chamber. The resistance of the vacuum chamber, or rather of the resilient walls thereof, opposing the movement of the spring varies with the atmospheric pressure, decreasing in proportion as the atmospheric pressure decreases, as is the case in all aneroid barometers of this type.

It is understood that the band 7 must be disposed just as the knife edge was, i. e. substantially parallel with the free edge of the spring 6 about which the angular movement of the upper leg of the spring takes place. The leaf spring or band 7 thus can readily adjust itself to any change of position induced by the angular movement of the spring without the interposition of a materially impeding resistance tending to cause a lag.

I claim as my invention:

1. In a pressure-responsive device of the aneroid type, an aneroid chamber, a flat spring anchored at one edge and having a portion overlying the aneroid chamber in spaced relation, and a connection between the aneroid chamber and the spring, said connection comprising a ribbon of thin resilient metal having substantially the tensile strength of steel and being disposed in a plane substantially parallel to the upper free edge at which the spring is anchored.

2. In a pressure-responsive device of the aneroid type, an aneroid chamber, a flat spring anchored at one edge and having a portion overlying the aneroid chamber in spaced relation, and a connection between the aneroid chamber and the spring, said connection comprising a band having substantially the tensile strength of steel and being flexible in a direction toward and away from the said anchoring edge.

In testimony whereof I affix my signature.

FLOYD B. NEWELL.